3,736,169
PYROLYTIC DEPOSITION PROCESS FOR APPLYING A MULTI-LAYER COATING TO A NUCLEAR FUEL KERNEL
Leslie Wilfred Graham, Wimborne, Eric Handley Voice, Weymouth, and Heinz Ulrich Brinkmann, Dorchester, England, assignors to United Kingdom Atomic Energy Authority, London, England
No Drawing. Filed Nov. 5, 1970, Ser. No. 87,348
Claims priority, application Great Britain, Nov. 5, 1969, 54,350/69
Int. Cl. G21c 3/06
U.S. Cl. 117—46 CG                 10 Claims

ABSTRACT OF THE DISCLOSURE

A pyrolytic deposition process for applying a multilayer coating to a nuclear fuel kernel, at least one of the layers being a metal carbide. The optimum temperature range for deposition of the metal carbide is determined and the other layers are deposited pyrolytically at a temperature within this range.

BACKGROUND OF THE INVENTION

The present invention relates to fission product retaining fuel for nuclear reactors. It is known to provide fuel for nuclear reactors in the form of kernels of nuclear fuel metal compounds, each kernel bearing an outer coating of material which retains fission products or at least delays their emission after formation. Generally speaking, the applied coating has been comprised by a number of layers, including one or more of pyrocarbon layers and, possibly, one layer of silicon carbide. The technique has been to employ different, and rather specific coating parameters for each layer in order to achieve a layer having certain properties and this has led to the application of coatings, some adjacent to one another, being applied at different temperatures. As a result, a complicated pattern of internal stresses can be set up and the effect of the interaction of these stresses on the performance of the particle is quite high. Moreover, the application of successive coatings at substantially different temperatures calls for a carefully programmed operation of the coating process to ensure the furnace is at the correct temperature over the appropriate period.

For optimum fission product retention it is usual to employ at least one layer of a metal carbide on the fuel kernel with or without layers of other material such as pyrolytically deposited carbon. In this context the term metal carbide includes silicon carbide.

BRIEF SUMMARY OF THE INVENTION

According to the present invention a process is provided for applying a multilayer coating to a kernel of a neclear fuel material by pyrolytic deposition, at least one of the layers comprising a metal carbide, the process residing in determining the optimum temperature for the deposition of the metal carbide, depositing the metal carbide at this temperature and depositing pyrolytically layers of other material at the same temperature whereby induced thermal stresses are reduced.

DETAILED DESCRIPTION

Preferably, the metal carbide is silicon carbide and the said other material is pyrocarbon. In the case of silicon carbide, it has been found that the optimum structure for the purpose of fission product retention may be obtained by the pyrolytic decomposition of methyltrichlorosilane vapour in the presence of hydrogen at a temperature of about 1630° C. Hence a preferred coating temperature for the multilayer coating is 1630° C. and suitably structured pyrolytic carbon may be laid down at this temperature or at a temperature close enough to the deposition temperature of silicone carbide as to minimize thermal stress formation.

Uranium oxide kernels can be provided with a combination of pyrolytically deposited coatings including differently structured pyrocarbon layers by selecting as the carbon source, butane gas of commercial purity, mixed with CO, argon or hydrogen as diluent, at a substantially uniform temperature, the different characteristics of the pyrocarbon layers being achieved by variation in the gas flow conditions. An interlayer of silicon carbide is deposited between the pyrocarbon layers and the deposition temperature of this interlayer, from methyltrichlorosilane, becomes the governing temperature of the process.

EXAMPLE

A 150-grain batch of $UO_2$ kernels each of about 800 microns diameter and about 16% porosity were coated in a fluidised bed coating apparatus. A number of coating layers were applied, corresponding in density and thickness to those presently recommended by the Dragon Project, as the reference coating for fission product retaining fuel. Accordingly the sequence of coating layers was as follows:

(1) Porous inner layer of pyrocarbon of about 1.0 gms./cc. density;

(2) Sealing layer of pyrocarbon of about 1.6 to 1.7 gms./cc. density;

(3) Barrier layer of pyrocarbon of about 1.8 gms./cc. density;

(4) Silicon carbide barrier layer of more than 3.2 gms./cc. density;

(5) Outer pyrocarbon barrier layer of about 1.6 to 1.8 gms./cc. density.

The first and second layers were applied employing butane gas as the source of carbon, and carbon monoxide as the diluent, fluidising gas. The third and fifth layers also employed butane as the coating gas but argon was used as the diluent, fluidising gas. For the silicon carbide layer hydrogen was used as the diluent gas and methyltrichlorosilane vapours as the coating source material. The coating temperature for the silicon carbide layer was about 1600° C. and the temperature of the coating apparatus did not depart from this by more than about ±50° C., tending towards the higher temperature for the outermost coating.

The different densities of the pyrocarbon layers were achieved by introducing suitable variations in the gas flow. In the example given the flow of the reactant into the furnace, i.e., the butane gas was initially introduced, for layer 1, at 3.5 litres per minute. At the commencement of layer 2, this was reduced to 1.6 litres per minute and for layer 3 it was further reduced to 1.0 litre per minute. For layer 4 hydrogen was bubbled through methyl trichlorosilane liquid at 0.4 litre per minute and for the final coating the flow rate of 1.0 litre per minute of butane was restored. The viation in the gas flow to produce the required differences in density will differ according to the particular design of coating furnace employed and also perhaps with the loading (grams) of particles in the furnace. However, if necessary a precise set of data on this parameter may be compiled by those skilled in the art without difficulty, to suit different furnace designs.

If desired the silicon carbide layer may be duplicated (with intervening layers of pyrocarbon).

$UO_2$ kernels coated with pyrocarbon layers from butane gas and with silicon carbide have undergone irradiation in the Dragon Reactor. These have reached a burn-up of 6% FIMA with neutron dose of $4 \times 10^{20}$ DNE.

What we claim is:

1. In a pyrolytic deposition process for applying a multilayer coating to a kernel of nuclear fuel by pyrolytic deposition from a gas or vapor wherein at least one of said layers consists essentially of silicon carbide pyrolytically deposited at a temperature within an optimum range giving optimum structure for fission product retention and at least one other layer consists essentially of pyrolytic carbon, the improvement of reducing thermal stresses resulting from depositing the multi-layer deposition wherein each layer of different pyrolytically deposited fission product retaining material is deposited at a temperature within 50° C. of the temperature at which the silicon carbide layer is deposited.

2. A process as claimed in claim 1 wherein said optimum temperature range is from 1550 to 1650° C.

3. A process as claimed in claim 2 wherein said nuclear fuel comprises uranium dioxide.

4. A process as claimed in claim 2 in which the silicon carbide layer is deposited by pyrolytic deposition from a silane vapor.

5. A process as claimed in claim 4 in which pyrolytic deposition of silicon carbide is effected at about 1630° C.

6. A process as claimed in claim 5 in which the hydrocarbon gas employed for all pyrocarbon coatings is butane.

7. A process as claimed in claim 1 which resides in fluidizing a bed of the kernels in a stream of hydrocarbon gas and a diluent gas, heating the bed of kernels to a temperature in the range 1550–1650° C. to deposite a layer consisting essentially of pyrocarbon on the kernels of the required thickness, discontinuing the supply of hydrocarbon gas and diluent gas and continuing fluidization of the bed with a stream of hydrogen/silane vapor while maintaining the temperature of the particles in the range from 1550 to 1650° C. to deposit a layer consisting essentially of silicon carbide and then restoring the conditions for the deposition of the pyrocarbon layer while maintaining the temperature of the particles in the range 1550–1650° C.

8. A process as claimed in claim 7 in which the diluent gas for the pyrocarbon coating nearest the kernel is different from that employed in respect of the further coatings.

9. A process as claimed in claim 8 in which carbon monoxide is employed as the diluent gas during application of the coating nearest the kernel.

10. A process as claimed in claim 7 in which an inert gas is employed as the diluent gas during the deposition of all pyrocarbon coatings.

References Cited

UNITED STATES PATENTS

| | | | |
|---|---|---|---|
| 3,249,509 | 5/1966 | Blocher | 176—91 SP |
| 3,312,597 | 4/1967 | Glueckauf | 176—91 SP |
| 3,276,968 | 10/1966 | Ingleby | 176—91 SP |
| 3,284,549 | 11/1966 | Ford et al. | 176—91 SP |
| 3,457,334 | 7/1969 | Horsley | 117—46 CG |
| 3,166,614 | 1/1965 | Taylor | 176—91 SP |
| 3,397,075 | 8/1968 | Browning et al. | 117—46 CG |
| 3,463,702 | 8/1969 | d'Eye et al. | 176—91 SP |
| 3,554,783 | 1/1971 | Beutler | 117—46 CG |

WILLIAM D. MARTIN, Primary Examiner

M. SOFOCLEOUS, Assistant Examiner

U.S. Cl. X.R.

117—100 B; 176—91 SP; 264—0.5; 23—355